United States Patent [19]

Bingmann

[11] 3,906,789
[45] Sept. 23, 1975

[54] MOBILE APPARATUS FOR CONTINUOUSLY MEASURING THE RESISTANCE OF TRACK RAILS TO LATERAL PRESSURES

[75] Inventor: Waldemar Bingmann, Essen, Germany

[73] Assignee: Franz Plasser Bahnbaumaschinen-Industriegesellschaft m.b.H., Vienna, Austria

[22] Filed: Sept. 16, 1974

[21] Appl. No.: 506,750

[30] Foreign Application Priority Data
Sept. 24, 1973 Germany............................ 2347951

[52] U.S. Cl..................................... 73/146; 33/144
[51] Int. Cl.²........................................ G01M 19/00
[58] Field of Search ................ 73/146; 33/144, 146

[56] References Cited
UNITED STATES PATENTS
3,828,440 8/1974 Plasser et al.......................... 33/144

Primary Examiner—Donald O. Woodiel
Attorney, Agent, or Firm—Kurt Kelman

[57] ABSTRACT

A leading and a trailing track gage carriage is coupled to a mobile rail test car and each carriage measures the track gage and emits a signal indicating the measured track gage. The track gage is measured by the carriages with a defined lateral pressure of different magnitudes, at least one of the pressures being sufficient to increase the track gage. A computer receives the signals instantaneously from the trailing carriage and with a delay from the leading carriage, which delay is determined by the spacing between the carriages and the concomitant distance traversed during the advancement of the car along the track. The two signals are compared in the computer to determine the increase in the track gage under a defined lateral pressure as the difference between the two signals. The determined track gage increase is a measure of the resistance of the track rails to the defined lateral pressure.

7 Claims, 1 Drawing Figure

US Patent    Sept. 23, 1975    3,906,789
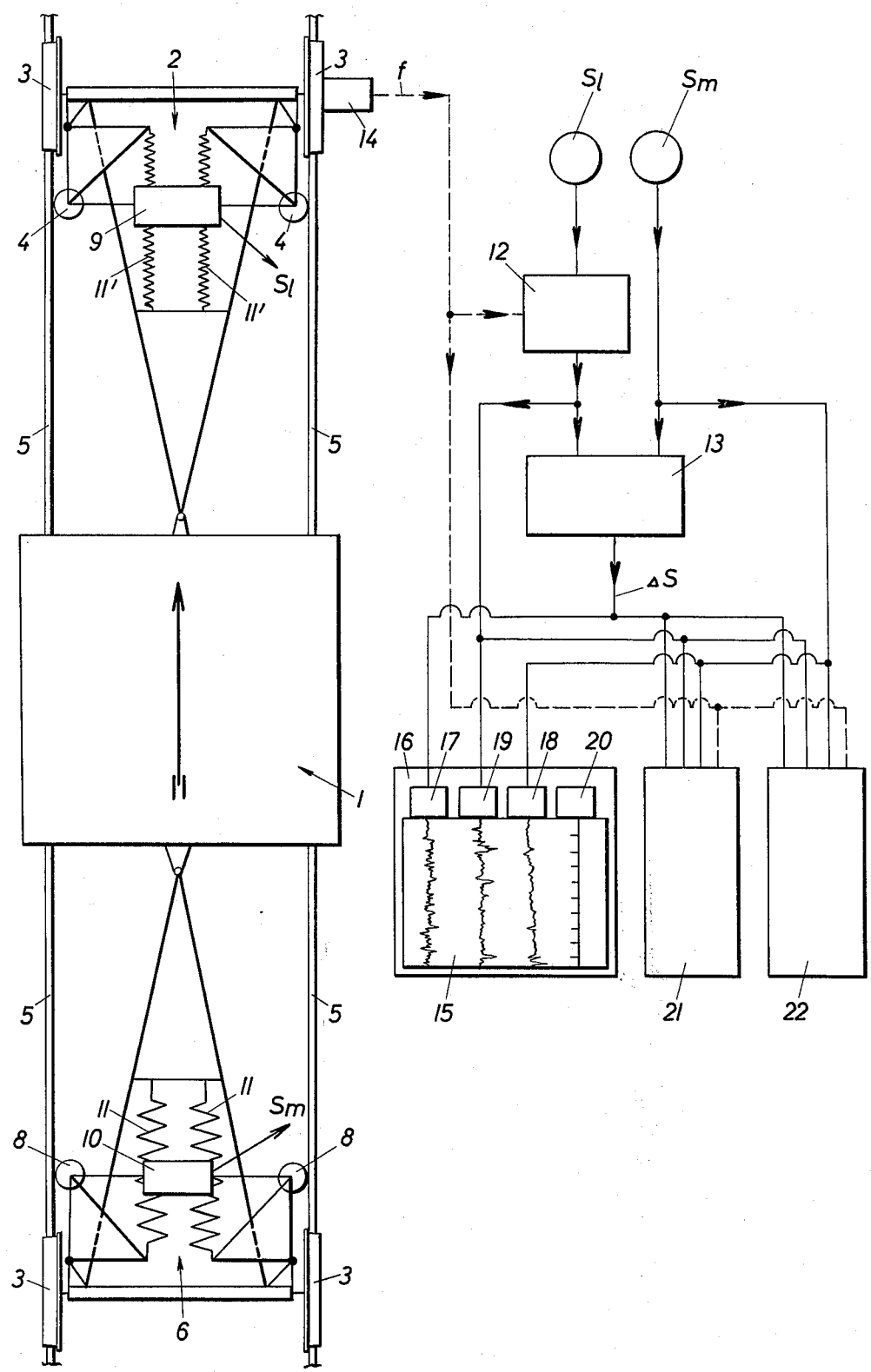

MOBILE APPARATUS FOR CONTINUOUSLY MEASURING THE RESISTANCE OF TRACK RAILS TO LATERAL PRESSURES

The present invention relates to a mobile apparatus for continuously measuring the resistance of track rails to lateral pressures tending to increase the track gage.

An apparatus for determining the resistance of track rails to lateral pressures exerted by railway cars and tending to increase the track gage is known. In a known apparatus of this type, a hydraulic pressure is applied laterally against the heads of the rails so as to increase the track gage in response to the induced pressure. The relationship between the pressure and the track gage increase gives a conclusive indication of the resistance of the track rails to lateral pressure at the point of measurement and a basic parameter for determining the permissible train speed in the measured track section.

Such an apparatus has the disadvantage that it must be positioned anew at each measuring point. The defined lateral pressure must then be applied, the resultant track gage increase must be determined and recorded. A track section of extended length thus requires numerous individual measurements and, corresponsingly, a considerable amount of time.

In U.S. Pat. No. 3,643,503, of Feb. 22, 1972, a method and apparatus for continuously moving a rail test car on and along a track, subjecting the track rails to mechanical forces, and measuring changes in the track produced by the mechanical forces to determine the track condition at successive track points.

It is the primary object of this invention to overcome the disadvantages of the known apparatus for determining the resistance of track rails to lateral pressures and to provide a mobile apparatus of this type for continuously measuring and recording the track gage and track gage increases under defined lateral pressures over an extended track section.

This and other objects are accomplished in accordance with the invention with a rail test car mounted for mobility on the track rails for advancing in the direction of track elongation, a leading track gage carriage coupled to the car and a trailing track gage carriage coupled to the car and spaced rearwardly of the leading track gage carriage in the direction of advancement of the car along the track. Each track gage carriage has means for measuring the track gage and for emitting a signal indicating the measured track gage, and the track gage measuring means of one of the carriages is adapted to measure the track gage with a defined lateral pressure of a magnitude different from that of the track gage measuring means of the other carriage, at least one of the defined lateral pressures being sufficient to increase the track gage while the other lateral pressure is preferably insufficient to increase the track gage. An electrical circuit is provided for transmitting the signals indicating the measured track gage from each of the carriages to a computer, the circuit including means for delaying the transmission of the signal from the leading carriage for a time corresponding to the spacing between the carriages and the concomitant distance traversed during the advancement of the car, and means for instantaneously transmitting the signal from the trailing carriage. Means in the computer compares the two signals and determines the increase in the track gage under a defined lateral pressure as the difference between the two signals, the determined track gage increase under the define lateral pressure being a measure of the resistance of the track rails to lateral pressure.

The resultant output signal of the computer may be transmitted to a moving chart advanced at the same speed as the car and the measured track gages are recorded in graphs on the moving chart.

The track gage measuring means preferably comprise pressure rollers, which may also serve as gaging wheels, arranged to exert the defined lateral pressure on the rail heads under a mechanical force, such as spring means having a defined bias. If desired, the spring means may be replaced by hydraulic or pneumatic pressure means.

The means for measuring the track gage and emitting a signal indicating the measured track gage may comprise transducer means for converting the measure track gage into an electrical signal proportional to the measured track gage, such means including resistive, capacitive, inductive or digital transducer means.

The means for delaying the transmission of the signal from the leading track gage carriage may be an analog delay circuit, such as a series-connected condenser unit, or a digital delay circuit, such as a shift register, for delaying the signal transmission in dependence on the distance the trailing carriage transverses until it reaches the track point where the leading carriage has measuired the track gage. This delay circuit may be incorporated into the computer. In such a computer, the signal proportional to track gage $S_1$ measured at the leading carriage without sufficient lateral pressure to increase the track gage may be deducted from the signal proportional to track gage $S_m$ measured at the trailing carriage with sufficient lateral pressure to increase the track gage, the resultant output signal of the computer thus indicating the difference $\Delta S$ of the two track gages, which is a measure of the resistance of the track rails to lateral pressures.

The two track gage carriages are spaced a sufficient distance apart so that the respective track gages measured by lateral pressures of different magnitude are not influenced by the pressures at the respective carriages.

The above and other advantages, objects and features of the present invention will become more apparent from the following detailed description of a now preferred embodiment thereof, taken in conjunction with the single FIGURE of the accompanying drawing showing a diagrammatic top view of a mobile apparatus with its computer and electrical circuit diagram.

The illustrated apparatus comprises rail test car 1 mounted for mobility on track rails 5, 5 for advancing in the direction of track elongation, as indicated by the arrow. Leading track gage carriage 2 is coupled to the car for advancement therewith and comprises flanged wheels 3 mounted on the carriage axle for movement on the track rails. A pair of gaging wheels 4, 4 is pivotally mounted on carriage 2 for engagement with the heads of rails 5, 5, the gaging wheels being biased into rail engagement by springs 11', 11'. The bias of the springs is so selected that the lateral pressure exerted by the gaging wheels is insufficient to increase the track gage, i.e., to move the rails laterally apart. The extent of the lateral distance or spread between gaging wheels 4, 4 indicates the track gage and automatically measures the track gage as the carriage advances along the track.

A like trailing track gage carriage 6 is coupled to the car and spaced rearwardly of the leading track gage carriage in the direction of advancement of the car along the track. The trailing carriage also runs on flanged wheels 3, 3 and a pair of gaging wheels 8, 8 is pivotally mounted on carriage 6 for engagement with the rail heads, the gaging wheels being biased into rail engagement by springs 11, 11. The bias of springs 11, 11 is so selected that the lateral pressure exerted by the gaging wheels is sufficient to increase the track gage, i.e., the gaging wheels constitute pressure rollers moving the rails laterally apart.

If desired, the bias of springs 11', 11' may also be selected so as to press the rails apart, but to an extent less than that of springs 11, 11, the only essential requirement being that the magnitudes of the lateral pressures differ from each other, one of the defined lateral pressures being sufficient to increase the track gage.

The pivotal linkages of gaging wheels 4, 4 and 8, 8 are connected to inductive devices 9 and 10, respectively, for converting the measured track gage constituted by the lateral distance between the gaging wheels into proportional analog electrical signals. Thus, gaging wheels 4, 4 and inductive spacing measuring device 9 as well as gaging wheels 8, 8 and the associated inductive measuring device 10 constitute means for measuring the track gage and for emitting a signal indicating the measured track gage.

An electrical circuit for transmitting the signals from each of the carriages to electronic computer 13 comprises means for delaying the transmission of the signal from leading carriage 2 for a time corresponding to the spacing between carriages 2 and 6 and the concomitant distance traversed during the advancement of car 1 by carriage 6 to reach the track point at which the signal from the leading carriage was emitted. This signal delay is produced by electronic delay circuit 12 controlled by this spacing between the carriages, the delay circuit delaying the input signal and delivering it in discrete output signals analogous to the distance between leading gaging wheels 4, 4 and trailing gaging wheels 8, 8. Thus, a series of discrete output signals from delay circuit 12 are delivered to computer 13 simultaneously with a corresponding series of output signals from inductive measuring device 10 which are transmitted to the computer instantaneously. Thus, two electrical input signals are continuously delivered to computer 13, one coming from delay circuit 12 and being proportional to the track gage measured by gaging wheels 4, 4 and the other one coming directly from inductive measuring device 10 and proportional to the track gage at the same track point measured subsequently by gaging wheels 8, 8. While the track gage measurements are subsequent to each other as car 1 advances along the track, delay circuit 12 assures that the signals are delivered simultaneously to the computer for comparison therein.

The stepwise control of delay circuit 12 in dependence on the distance traversed by carriage 6 to reach the previous position of carriage 2 is effectuated by control signal $f$ from odometer 14 which is coupled to wheel 3. The two input signals are compared in computer 13 which delivers an output signal constituted by the difference between the two signals, this output signal being proportional to the determined track gage increase $\Delta S$ under the defined lateral pressure exerted by springs 11, 11.

Output signal $\Delta S$ of computer 13 is transmitted to recorder 16 which comprises moving chart 15. The output signal from the computer operates a stylo which records graph 17 on the chart to show the measure of the resistance of the track rails to lateral pressure along the entire track section traversed by the apparatus. The electrical signals from track gaging wheels 8, 8 are recorded on chart 15 as graph 18 and the discrete signals from delay circuit 12, which are reflective of the track gages measured by gaging wheels 4, 4, are recorded on the chart as graph 19, all the graphs being recorded side-by-side to distance markers 20 showing the distance traversed by car 1 and correspondingly by moving chart 15.

It may be desirable, as illustrated, to use the electrical track gage signals further to determine limiting values, the frequency of certain values and various track characteristics by storing the signals in memory 22 and evaluating them in a further computer means 21, this automatic evaluation making it possible to determine permissible maximum train speeds on the surveyed track section, based on the surveyed track conditions, and/or the necessity for desirability of track maintenance work on certain track parts, such as tie tamping and/or tightening of rail fasteners.

To avoid the influence of a possible play caused by loose rail fasteners on the measured track gage, it may be useful for the magnitudes of both lateral pressures to be sufficient to spread the rail aparts, as long as the pressure of one track gage exceeds that of the other so that a differential pressure may be established.

The determined track gage difference $\Delta S$ is not always proportional to the lateral pressure at a measuring point but becomes progressive or degressive in relation to increasing lateral pressures. This may make it desirable or necessary to determine the increase in the track gage with a series of defined lateral pressures of different magnitude. For this purpose, more than one pair of leading and trailing track gage carriages sufficiently spaced apart may be arranged on the mobile apparatus. These track gages are arranged to measure the track gage at increasing magnitudes of force. To deliver all track gage signals belonging to the same track point to the computer simultaneously, each signal $S_1$, $S_{m1}$, $S_{m2}$ . . . $S_{m(n-1)}$ of the leading track gage carriage is delayed for a time corresponding to the spacing between the leading and trailing carriages so that the signals from the leading carriages reach the computer at the same time as signals $S_{mn}$ from the trailing carriages. The computer than computes the track gage increases due to lateral pressures of different magnitudes according to the following equation:

$\Delta S_1 = S_{m1} - S_1; \Delta S_2 = S_{m2} - S_1 \ldots \Delta S_n = S_{mn} - S_1.$ While inductive devices 9, 10 have been described for converting the track gage measurements into proportional electrical signals, as have been used conventional in track gages, other types of transducer devices may be used, such as resistive devices, i.e., potentiometers, capacitive or digital means.

While a separate delay circuit controlled by signals determined by the distance traversed by the mobile apparatus has been illustrated and described, it is also possible to store the signals from the one track gage in the computer to accomplish the desired delay, the control signals being transmitted directly to the computer for controlling the comparison of the track gage input signals therein.

What is claimed is:

1. A mobile apparatus for continuously measuring the resistance of track rails to lateral pressures tending to increase the track gage, comprising
   1. a rail test car mounted for mobility on the track rails for advancing in the direction of track elongation,
   2. a leading track gage carriage coupled to the car,
   3. a trailing track gage carriage coupled to the car and spaced rearwardly of the leading track gage carriage in the direction of advancement of the car along the track,
      a. each track gage carriage having means for measuring the track gage and for emitting a signal indicating the measured track gage, and
      b. the track gage measuring means of one of the carriages being adapted to measure the track gage with a defined lateral pressure of a magnitude different from that of the track gage measuring means of the other carriage, at least one of the defined lateral pressures being sufficient to increase the track gage,
   4. a computer, and
   5. an electrical circuit for transmitting the signals indicating the measured track gage from each of the carriages to the computer, the circuit including
      a. means for delaying the transmission of the signal from the leading carriage for a time corresponding to the spacing between the carriages and the concomitant distance traversed during the advancement of the car and
      b. means for instantaneously transmitting the signal from the trailing carriage, and
   6. means in the computer for comparing the two signals and determining the increase in the track gage under a defined lateral pressure as the difference between the two signals, the determined track gage increase under the defined lateral pressure being a measure of the resistance of the track rails to lateral pressures.

2. The mobile apparatus of claim 1, wherein one of the defined lateral pressures is not sufficient to increase the track gage.

3. The mobile apparatus of claim 1, wherein the track measuring means comprise mechanical means for exerting the defined lateral pressures.

4. The mobile apparatus of claim 3, wherein the mechanical means are spring means having a defined bias.

5. The mobile apparatus of claim 1, wherein the track gage measuring means comprise pressure rollers arranged to exert the defined lateral pressures on the track rails.

6. The mobile apparatus of claim 5, wherein the pressure rollers constitute gaging wheels of the track gage measuring means.

7. The mobile apparatus of claim 1, wherein the means for measuring the track gage and for emitting a signal indicating the measured track gage comprises transducer means for converting the measured track gage into an electrical signal.

* * * * *